US012507804B2

(12) United States Patent
Donat et al.

(10) Patent No.: US 12,507,804 B2
(45) Date of Patent: Dec. 30, 2025

(54) ADJUSTABLE SEAT FOR A BOAT

(71) Applicant: Polaris Industries Inc., Medina, MN (US)

(72) Inventors: Blair A. Donat, Elkhart, IN (US); David A. Yoder, Elkhart, IN (US)

(73) Assignee: POLARIS INDUSTRIES INC., Medina, MN (US)

( * ) Notice: Subject to any disclaimer, the term of this patent is extended or adjusted under 35 U.S.C. 154(b) by 0 days.

(21) Appl. No.: 18/633,043

(22) Filed: Apr. 11, 2024

(65) Prior Publication Data

US 2024/0251953 A1 Aug. 1, 2024

Related U.S. Application Data

(63) Continuation of application No. 17/215,368, filed on Mar. 29, 2021, now Pat. No. 11,992,131.

(60) Provisional application No. 63/002,815, filed on Mar. 31, 2020.

(51) Int. Cl.
*A47C 7/48* (2006.01)
*A47C 7/40* (2006.01)
*B63B 29/04* (2006.01)

(52) U.S. Cl.
CPC ................ *A47C 7/48* (2013.01); *A47C 7/407* (2013.01); *B63B 29/04* (2013.01); *B63B 2029/043* (2013.01)

(58) Field of Classification Search
CPC ........... A47C 7/48; A47C 7/407; B63B 29/04; B63B 2029/043
See application file for complete search history.

(56) References Cited

U.S. PATENT DOCUMENTS 31,563 A 2/1861 Seibert et al.
717,662 A 1/1903 Ellison
731,515 A 6/1903 Sheen et al.
998,437 A 7/1911 Wieland
(Continued)

FOREIGN PATENT DOCUMENTS

FR 2387840 A1 11/1978
FR 2636295 A1 3/1990
(Continued)

OTHER PUBLICATIONS

International Search Report and Written Opinion issued by the International Searching Authority, dated Jul. 22, 2019, for International Patent Application No. PCT/US2019/33146; 8 pages.
(Continued)

*Primary Examiner* — Stephen P Avila
(74) *Attorney, Agent, or Firm* — SCHWEGMAN LUNDBERG & WOESSNER, P.A.

(57) ABSTRACT

An adjustable seat assembly may have a seat back that is configurable in a fore position or a stern-facing seat, an aft position for a bow-facing seat, and a pillow position which facilitates a user laying down across the stern-facing seat. In addition, the seat back may be placed in a stowed position in which the seat back is absent from both the bow-facing and stern-facing seats, such that the seats cooperate to provide a planar support surface along an aft-to-fore extent of the seat assembly. The seat back may be adjustable by hand without tools, such that a user may easily reconfigure the seat assembly to sit facing the bow, to sit facing the stern, or to lie down.

21 Claims, 12 Drawing Sheets

32
34
42
40
44
36
30

(56) References Cited

U.S. PATENT DOCUMENTS 1,178,285 A * 4/1916 Adams .............. B61D 33/0028 297/97
1,202,713 A 10/1916 Hedges
1,448,921 A 3/1923 Ershkowitz
1,646,266 A 10/1927 Stoner
2,249,958 A 7/1941 Inwood
2,448,075 A 8/1948 Bortner
2,491,609 A 12/1949 George
2,821,989 A 2/1958 Shepard
2,910,033 A 10/1959 Weisburg
2,919,669 A 1/1960 Shizuo
2,959,146 A 11/1960 Erkert
2,990,802 A 7/1961 Eric et al.
3,002,484 A 10/1961 Dube
3,065,724 A 11/1962 Tritt
3,067,711 A 12/1962 Hesher et al.
3,103,947 A 9/1963 Mueller
3,115,860 A 12/1963 Payne
3,130,852 A 4/1964 Cook
3,202,453 A 8/1965 Richards
3,230,918 A 1/1966 Compton
3,352,447 A 11/1967 Hahn
3,361,227 A 1/1968 Kauko
3,363,598 A 1/1968 Mortrude
3,369,518 A 2/1968 Jacobson
3,401,663 A 9/1968 Yost
3,405,677 A 10/1968 Smith
3,456,613 A 7/1969 Smith
3,481,297 A 12/1969 Mantle
3,485,198 A 12/1969 Matthews
3,648,641 A 3/1972 Normand, Jr.
3,685,061 A 8/1972 Wray
3,695,210 A 10/1972 Stein
3,702,106 A 11/1972 Wilder
3,707,936 A 1/1973 Harris
3,782,320 A 1/1974 Groves
3,829,153 A 8/1974 Fussell et al.
3,908,797 A 9/1975 Schnepp
3,937,173 A 2/1976 Stuart
3,996,871 A 12/1976 Boismard
4,005,674 A 2/1977 Davis
4,019,456 A 4/1977 Harbert
4,051,801 A 10/1977 Woodfill et al.
4,056,211 A 11/1977 Zumwalt
4,084,533 A 4/1978 Boyer
4,084,536 A 4/1978 Stansbury
4,100,877 A 7/1978 Scott et al.
4,223,630 A 9/1980 Keeney
4,247,232 A 1/1981 McCreery et al.
4,311,317 A 1/1982 Bartels
D263,293 S 3/1982 Janson
4,320,713 A 3/1982 Nishida et al.
4,348,972 A 9/1982 Parsons
4,385,580 A 5/1983 Davidson
4,404,714 A 9/1983 Duran
4,413,215 A 11/1983 Cavil et al.
4,420,741 A 12/1983 West
4,448,430 A 5/1984 Bright
4,470,629 A * 9/1984 Collins, Jr. ............ A47C 17/34 297/67
4,509,927 A 4/1985 Ikeda
4,568,293 A 2/1986 Yazaki
4,588,220 A 5/1986 Matsui et al.
4,609,360 A 9/1986 Whitehead
4,616,168 A 10/1986 Nishida
4,629,434 A 12/1986 Monreal
4,637,081 A 1/1987 Clark
4,643,685 A 2/1987 Nishida
4,678,444 A 7/1987 Monreal
4,688,508 A 8/1987 Nishida
4,690,094 A 9/1987 Taylor
4,706,702 A 11/1987 Grasseschi
4,709,648 A 12/1987 Andrews
4,744,325 A 5/1988 Nobayashi
4,756,332 A 7/1988 Grasseschi
4,760,810 A 8/1988 Kobayashi
4,762,078 A 8/1988 Palmer, Jr.
4,799,444 A 1/1989 Lisowski
4,824,409 A 4/1989 Kobayashi
4,840,592 A 6/1989 Anderson
4,870,843 A 10/1989 Lundberg
4,875,882 A 10/1989 Plitt et al.
4,875,884 A 10/1989 Meisenburg
4,896,621 A 1/1990 Coles
4,907,520 A 3/1990 Pipkorn
4,926,783 A 5/1990 Lathers
4,932,347 A 6/1990 Mardikian
4,941,854 A 7/1990 Takahashi et al.
4,942,837 A 7/1990 Hellmann et al.
4,942,838 A 7/1990 Boyer et al.
4,947,781 A 8/1990 Norman
4,964,357 A 10/1990 Genfan
RE33,488 E 12/1990 Kobayashi
4,982,682 A 1/1991 Hattori
4,986,777 A 1/1991 Preston
4,989,409 A 2/1991 Nakase et al.
4,997,399 A 3/1991 Nakayasu et al.
4,998,966 A 3/1991 Yamaguchi
5,005,963 A 4/1991 Schmidt et al.
5,007,870 A 4/1991 Okubo et al.
5,036,789 A 8/1991 Kelly et al.
5,037,687 A 8/1991 Kargarzadeh et al.
5,043,727 A 8/1991 Ito
5,049,096 A 9/1991 Henn
5,062,815 A 11/1991 Kobayashi
5,064,157 A 11/1991 O'Neal
5,067,448 A 11/1991 Nakase et al.
5,067,918 A 11/1991 Kobayashi
5,076,188 A 12/1991 Burroughs
5,096,208 A 3/1992 Westberg
5,096,753 A 3/1992 McCue et al.
5,097,789 A 3/1992 Oka
5,101,753 A 4/1992 Hull et al.
5,135,239 A 8/1992 Kato et al.
5,141,456 A 8/1992 Langenberg et al.
5,149,569 A 9/1992 McCue
5,151,057 A 9/1992 Kobayashi et al.
5,154,650 A 10/1992 Nakase
5,184,564 A 2/1993 Robbins et al.
5,199,373 A 4/1993 Mardikian
5,199,913 A 4/1993 Toyohara et al.
5,216,421 A 6/1993 Sawada et al.
5,234,364 A 8/1993 Ito
5,239,884 A 8/1993 Norsen
5,255,626 A 10/1993 Hattori et al.
5,256,092 A 10/1993 Jones
D343,160 S 1/1994 LaPointe
5,289,997 A 3/1994 Harris
5,296,973 A 3/1994 Burke
5,303,667 A 4/1994 Zirkelbach et al.
5,304,078 A 4/1994 Kaneko
5,312,275 A 5/1994 Place
5,315,895 A 5/1994 Kattus et al.
5,329,871 A 7/1994 Gibbs
D349,879 S 8/1994 Jaramillo, Sr.
D350,325 S 9/1994 Mardikian
5,350,325 A 9/1994 Nanami
5,355,826 A 10/1994 Hattori et al.
5,366,401 A 11/1994 Nanami et al.
5,367,977 A 11/1994 Ellis et al.
5,389,022 A 2/1995 Kobayashi
5,390,621 A 2/1995 Hattori et al.
5,399,111 A 3/1995 Kobayashi et al.
5,405,278 A 4/1995 Garland
5,413,063 A 5/1995 King
D359,469 S 6/1995 Yoshida et al.
D359,720 S 6/1995 Jaramillo, Sr.
5,438,946 A 8/1995 Kobayashi
5,447,116 A 9/1995 Kobayashi
5,449,305 A 9/1995 Kobayashi et al.
5,458,079 A 10/1995 Matthews et al.
5,462,292 A 10/1995 Yamane
5,464,301 A 11/1995 Kramer
5,474,007 A 12/1995 Kobayashi

(56) References Cited

U.S. PATENT DOCUMENTS 5,490,474 A 2/1996 Ikeda
5,494,464 A 2/1996 Kobayashi et al.
5,503,419 A 4/1996 Gardner
5,507,672 A 4/1996 Imaeda
5,511,505 A 4/1996 Kobayashi et al.
5,520,139 A 5/1996 King et al.
5,524,597 A 6/1996 Hiki et al.
5,536,189 A 7/1996 Mineo
5,540,174 A 7/1996 Kishi et al.
5,544,607 A 8/1996 Rorabaugh et al.
5,551,898 A 9/1996 Matsumoto
5,556,314 A 9/1996 Fukuda et al.
5,572,943 A 11/1996 Kobayashi et al.
5,588,388 A 12/1996 Maruyama et al.
5,593,329 A 1/1997 Kato
5,603,644 A 2/1997 Kobayashi et al.
5,607,332 A 3/1997 Kobayashi et al.
5,613,459 A 3/1997 Remy
5,613,887 A 3/1997 Kobayashi
D380,437 S 7/1997 Saulters
5,655,473 A 8/1997 Arvilla
5,664,515 A 9/1997 Hattori et al.
5,669,326 A 9/1997 Ikeda
5,676,575 A 10/1997 Fukuda et al.
5,678,827 A 10/1997 Burian et al.
5,697,320 A 12/1997 Murray
5,699,750 A 12/1997 Schneider
5,706,752 A 1/1998 Menne et al.
5,707,264 A 1/1998 Kobayashi et al.
5,713,297 A 2/1998 Tani et al.
5,730,077 A 3/1998 Nunes et al.
5,735,229 A 4/1998 House et al.
5,743,204 A 4/1998 Tweet
5,743,206 A 4/1998 Hattori
5,752,864 A 5/1998 Jones et al.
5,752,867 A 5/1998 Koyanagi
5,755,601 A 5/1998 Jones
5,799,605 A 9/1998 Huse
5,803,104 A 9/1998 Pollen
D399,182 S 10/1998 Lapointe
5,826,532 A 10/1998 Elvestad
5,829,378 A 11/1998 Nunes et al.
5,868,455 A 2/1999 Springer et al.
5,882,796 A 3/1999 Wilson et al.
5,894,810 A 4/1999 Orr
5,899,779 A 5/1999 Hattori
5,904,114 A 5/1999 Wright
5,908,006 A 6/1999 Ibata
5,913,571 A 6/1999 Dystra et al.
5,915,329 A 6/1999 Watkins et al.
5,918,564 A 7/1999 Ohtsuka et al.
5,931,114 A 8/1999 Bartholomew
5,934,953 A 8/1999 Kobayashi
5,934,954 A 8/1999 Schott et al.
5,964,172 A 10/1999 Ikeda
6,000,355 A 12/1999 Hall
6,006,692 A 12/1999 Szukhent, Jr.
6,010,140 A 1/2000 Guynn
6,010,378 A 1/2000 Fujimoto et al.
6,016,762 A 1/2000 Price
6,022,253 A 2/2000 Ozawa et al.
6,032,605 A 3/2000 Takashima
6,035,802 A 3/2000 Lussier
6,041,727 A 3/2000 Yamada et al.
6,050,867 A 4/2000 Shields et al.
6,066,014 A 5/2000 Smith et al.
6,085,685 A 7/2000 Morishige
6,089,932 A 7/2000 Nanami et al.
6,095,876 A 8/2000 Ozawa et al.
6,105,527 A 8/2000 Lochtefeld et al.
6,112,685 A 9/2000 Matsuda et al.
6,115,860 A 9/2000 Vrzalik
6,116,182 A 9/2000 Koyanagi
6,135,832 A 10/2000 Suzuki
6,139,381 A 10/2000 Suzuki et al.
6,145,458 A 11/2000 Hattori
6,152,587 A 11/2000 Berg
6,158,378 A 12/2000 Tsumiyama et al.
6,182,590 B1 2/2001 Patera
6,224,440 B1 5/2001 Shimizu
6,237,522 B1 5/2001 Kiyohara et al.
6,250,983 B1 6/2001 Paterson
D444,761 S 7/2001 Momoi et al.
6,260,505 B1 7/2001 Polidan
6,276,290 B1 8/2001 Yamada et al.
6,283,059 B1 9/2001 Scully, Jr.
6,308,650 B1 10/2001 Tsumiyama et al.
6,322,409 B1 11/2001 Hattori et al.
6,345,585 B1 2/2002 Hovda et al.
6,349,662 B1 2/2002 Limansky et al.
6,349,666 B1 2/2002 Hastings
6,375,527 B2 4/2002 Gohara
6,379,204 B2 4/2002 Bolen
6,419,533 B2 7/2002 Lecours
6,435,924 B2 8/2002 Ishino
D462,644 S 9/2002 Aselton et al.
D463,355 S 9/2002 Bucaccio et al.
D463,770 S 10/2002 Aselton et al.
D464,015 S 10/2002 Bucaccio et al.
D464,016 S 10/2002 Orr et al.
6,457,433 B1 10/2002 Nagata
6,471,557 B1 10/2002 Hattori
6,471,558 B1 10/2002 Nakatsuji et al.
D465,191 S 11/2002 Bucaccio et al.
D465,192 S 11/2002 Bucaccio et al.
6,491,557 B2 12/2002 Tamaki
6,506,086 B2 1/2003 Matsumoto
6,523,490 B1 2/2003 Watkins
6,546,884 B1 4/2003 Rodriguez
6,546,888 B2 4/2003 Bertrand et al.
6,547,611 B1 4/2003 Boroos et al.
6,553,928 B2 4/2003 Yamada et al.
6,578,508 B2 6/2003 Hattori et al.
D476,612 S 7/2003 Bills et al.
D476,613 S 7/2003 Bills et al.
D477,560 S 7/2003 Bills et al.
D478,034 S 8/2003 Bills et al.
D478,035 S 8/2003 Bills et al.
D482,316 S 11/2003 Bills et al.
6,647,916 B2 11/2003 Neese et al.
6,651,579 B1 11/2003 Wynne et al.
D485,799 S 1/2004 Nugteren et al.
6,672,241 B2 1/2004 Warfel et al.
6,675,736 B1 1/2004 Schreiber et al.
6,681,712 B1 1/2004 Andreae et al.
D487,246 S 3/2004 Bills et al.
D487,718 S 3/2004 Bills et al.
D487,883 S 3/2004 Bills et al.
6,712,016 B1 3/2004 Morisch et al.
D488,117 S 4/2004 Bills et al.
6,722,301 B2 4/2004 Nagata et al.
6,739,921 B2 5/2004 Nakajima et al.
6,755,704 B1 6/2004 Leinonen
6,755,705 B1 6/2004 Slattery
6,789,494 B2 9/2004 Neese et al.
6,807,920 B1 10/2004 Wynne
6,807,922 B1 10/2004 Bills et al.
6,808,433 B1 10/2004 Slattery et al.
6,820,569 B2 11/2004 Warfel et al.
6,843,192 B1 1/2005 Nugteren et al.
6,863,013 B2 3/2005 Noyes, Jr.
6,863,582 B1 3/2005 Wynne
6,880,475 B1 4/2005 Thompson
6,932,012 B1 8/2005 Philips et al.
6,959,660 B1 11/2005 Packebush
6,988,456 B1 1/2006 Schooler
7,051,669 B2 5/2006 Warfel et al.
7,107,926 B2 9/2006 Fishburn
7,137,351 B2 11/2006 Picou
7,240,632 B1 7/2007 Wynne et al.
7,255,403 B2 8/2007 Butler
7,367,616 B2 5/2008 Summerford
7,430,980 B2 10/2008 Fishburn
7,490,896 B2 2/2009 Smith

(56) References Cited

U.S. PATENT DOCUMENTS

| | | | |
|---|---|---|---|
| 7,513,211 | B1 | 4/2009 | Farb et al. |
| 8,028,641 | B1 | 10/2011 | Sly |
| 8,113,137 | B2 | 2/2012 | Thompson |
| 8,151,925 | B2 | 4/2012 | Aramayo et al. |
| 8,375,880 | B1 | 2/2013 | St et al. |
| 8,474,393 | B1 | 7/2013 | Chandler |
| 8,496,082 | B2 | 7/2013 | Aramayo, II et al. |
| 8,678,464 | B2 | 3/2014 | Smith et al. |
| 8,899,169 | B1 | 12/2014 | Jaziri |
| 8,905,435 | B2 | 12/2014 | Ripley et al. |
| 9,073,608 | B1 | 7/2015 | Foss et al. |
| 9,260,166 | B1 | 2/2016 | Fodor et al. |
| 9,415,836 | B1 | 8/2016 | Eekhoff et al. |
| 9,487,273 | B1 | 11/2016 | Eekhoff et al. |
| 9,873,487 | B1 | 1/2018 | Eekhoff et al. |
| 2001/0000052 | A1 | 3/2001 | Yamada et al. |
| 2001/0002759 | A1 | 6/2001 | Nishide |
| 2001/0047744 | A1 | 12/2001 | Aselton et al. |
| 2002/0023579 | A1 | 2/2002 | Profitt et al. |
| 2002/0053310 | A1 | 5/2002 | Ibata et al. |
| 2002/0077007 | A1 | 6/2002 | Dagenais et al. |
| 2002/0182949 | A1 | 12/2002 | Tanaka et al. |
| 2003/0061975 | A1 | 4/2003 | Nadeau et al. |
| 2004/0048527 | A1 | 3/2004 | Yokoya |
| 2004/0058597 | A1 | 3/2004 | Matsuda |
| 2006/0061154 | A1 | 3/2006 | Kahan |
| 2007/0035166 | A1 | 2/2007 | Summerford |
| 2009/0277372 | A1 | 11/2009 | Wood et al. |
| 2010/0018451 | A1 | 1/2010 | Sahr |
| 2021/0214052 | A1 | 7/2021 | Mast |
| 2021/0298483 | A1 | 9/2021 | Donat et al. |

FOREIGN PATENT DOCUMENTS

| | | | |
|---|---|---|---|
| FR | 2806696 | A1 | 9/2001 |
| JP | 62-247994 | A | 10/1987 |
| JP | 08-031648 | A | 2/1996 |
| JP | 2002-337786 | A | 11/2002 |
| WO | 91/17080 | A1 | 11/1991 |

OTHER PUBLICATIONS

World Champion Watercraft components. Product sheet [online]. River Pot Design, 2001, [retrieved on Jul. 2, 2003]. Retrieved from the Internet: <URL:web.archive.org/web/20010926015150/http://www.rpotdesign.com/.

"U.S. Appl. No. 17/215,368, 312 Amendment filed Apr. 11, 2024", 8 pgs.

"U.S. Appl. No. 17/215,368, Non Final Office Action mailed Sep. 19, 2023", 7 pgs.

"U.S. Appl. No. 17/215,368, Notice of Allowance mailed Jan. 23, 2024", 7 pgs.

"U.S. Appl. No. 17/215,368, Notice of Allowance mailed Jan. 29, 2024", 2 pgs.

"U.S. Appl. No. 17/215,368, PTO Response to Rule 312 Communication mailed Apr. 19, 2024", 2 pgs.

"U.S. Appl. No. 17/215,368, Response filed Dec. 12, 2023 to Non Final Office Action mailed Sep. 19, 2023", 12 pgs.

"Canadian Application Serial No. 3,113,611, Examiners Rule 86(2) Report mailed Dec. 24, 2024", 8 pgs.

"Canadian Application Serial No. 3,113,611, Response filed Apr. 23, 2025 to Examiners Rule 86(2) Report mailed Dec. 24, 2024", 8 pgs.

"Canadian Application Serial No. 3,113,611, Office Action mailed Dec. 28, 2023", 7 pgs.

* cited by examiner

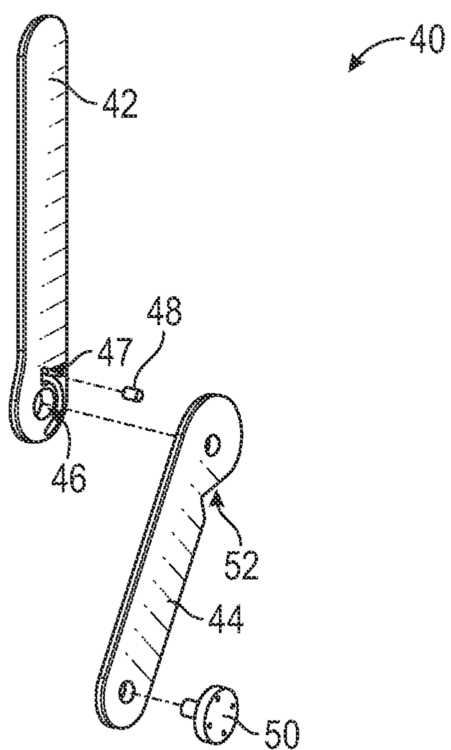
FIG. 13
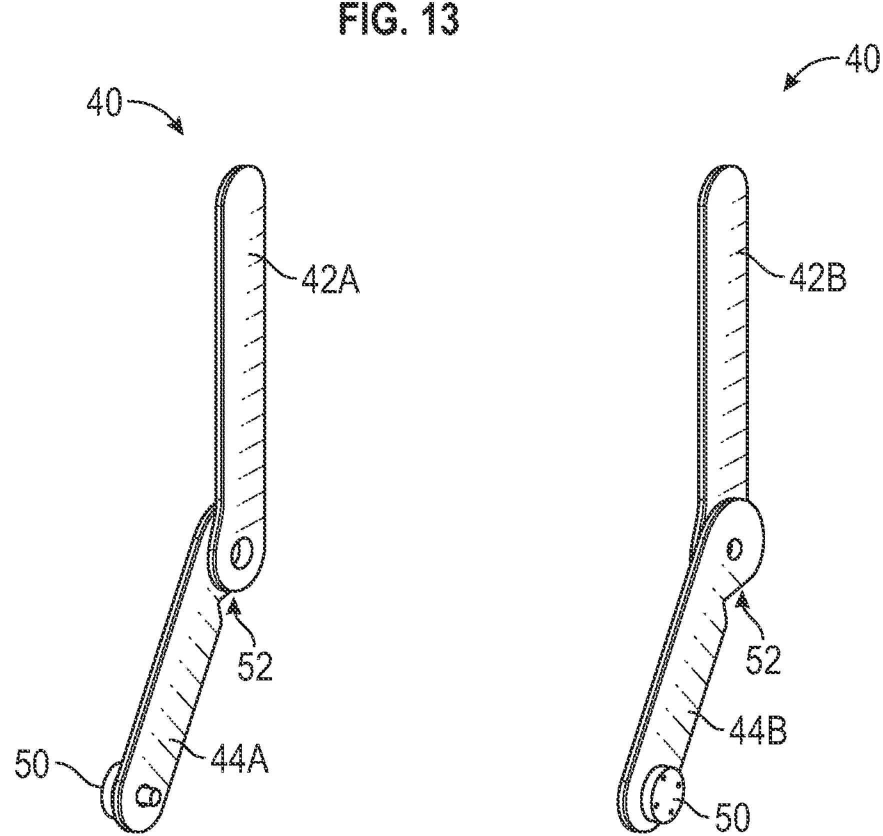
FIG. 14A
FIG. 14B

ADJUSTABLE SEAT FOR A BOAT

CROSS-REFERENCE TO RELATED APPLICATION

This application is a continuation of U.S. patent application Ser. No. 17/215,368, filed Mar. 29, 2021, entitled ADJUSTABLE SEAT FOR A BOAT, which claims the benefit of U.S. Provisional Patent Application No. 63/002,815 filed May 31, 2020 and entitled ADJUSTABLE SEAT FOR A BOAT, the entire disclosures of which are incorporated herein by reference.

BACKGROUND

1. Technical Field

The present disclosure relates to a seat assembly for boats and, in particular, to an adjustable seat for a pontoon boat.

2. Description of the Related Art

Pontoon boats have two or more longitudinally extending floatation devices, or pontoons, which provide buoyancy sufficient to float the pontoon, a deck mounted atop the pontoons, associated boat equipment including seats and controls, and passengers and cargo. Pontoon boats are favored for their large deck areas, smooth ride, and suitability for shallow-water use, beach-docking capability, and general suitability for small lakes and rivers.

Pontoon boats are often designed to accommodate several passengers simultaneously. Accordingly, many pontoon boats have a variety of seats both fore and aft of the operator control station.

What is needed is an improvement over the foregoing.

SUMMARY

The present disclosure provides an adjustable seat assembly which may have a seat back that is configurable in a fore position or a stern-facing seat, an aft position for a bow-facing seat, and a pillow position which facilitates a user laying down across the stern-facing seat. In addition, the seat back may be placed in a stowed position in which the seat back is absent from both the bow-facing and stern-facing seats, such that the seats cooperate to provide a planar support surface along an aft-to-fore extent of the seat assembly. The seat back may be adjustable by hand without tools, such that a user may easily reconfigure the seat assembly to sit facing the bow, to sit facing the stern, or to lie down.

In one form thereof, the present disclosure provides a seat assembly for a boat, the seat assembly including an aft seat a fore seat, and a seat back pivotable between a first seating orientation and a second seating orientation, the seat back further adjustable into a pillow orientation from one of the first orientation and the second orientation.

In another form thereof, the present disclosure provides a seat assembly for a boat, the seat assembly including an aft seat, a fore seat, and a seat back pivotable between a first seating orientation and a second seating orientation, the seat back, the seat back also pivotable into a stowed position beneath one of the fore seat and the aft seat.

In yet another form thereof, the present disclosure provides a pontoon boat including at least two pontoons, a deck having the seat assembly fixed thereto, a motor, controls operable to control the motor and steer the pontoon boat, and a seat assembly. The seat assembly includes an aft seat, a fore seat, and a seat back pivotable between a first seating orientation and a second seating orientation, the seat back further adjustable into a pillow orientation from one of the first orientation and the second orientation.

In still another form thereof, the present disclosure provides a method of adjusting a seat assembly on a pontoon boat, the method including changing a seating configuration from a couch-type seating arrangement to a recliner-type seating arrangement by pivoting a seat back between an aft position and a fore position, the aft position defining an obtuse angle between a fore-facing surface of the seat back an adjacent fore seating surface, and the fore position defining an obtuse angle between an aft-facing surface of the seat back an adjacent aft seating surface. The seat back is further pivoted from one of the aft position and the fore position into a pillow position, such that the pillow position defines an increased obtuse angle relative to the respective obtuse angle.

BRIEF DESCRIPTION OF THE DRAWINGS

The above-mentioned and other features and advantages of this invention, and the manner of attaining them, will become more apparent and the invention itself will be better understood by reference to the following description of embodiments of the invention taken in conjunction with the accompanying drawings, wherein:

FIG. 13 is a perspective, exploded view of the components of the portion of the linkage assembly shown in FIG. 12; and FIGS. 14A and 14B are perspective views of opposing portions of the linkage assembly.

Figure 1:
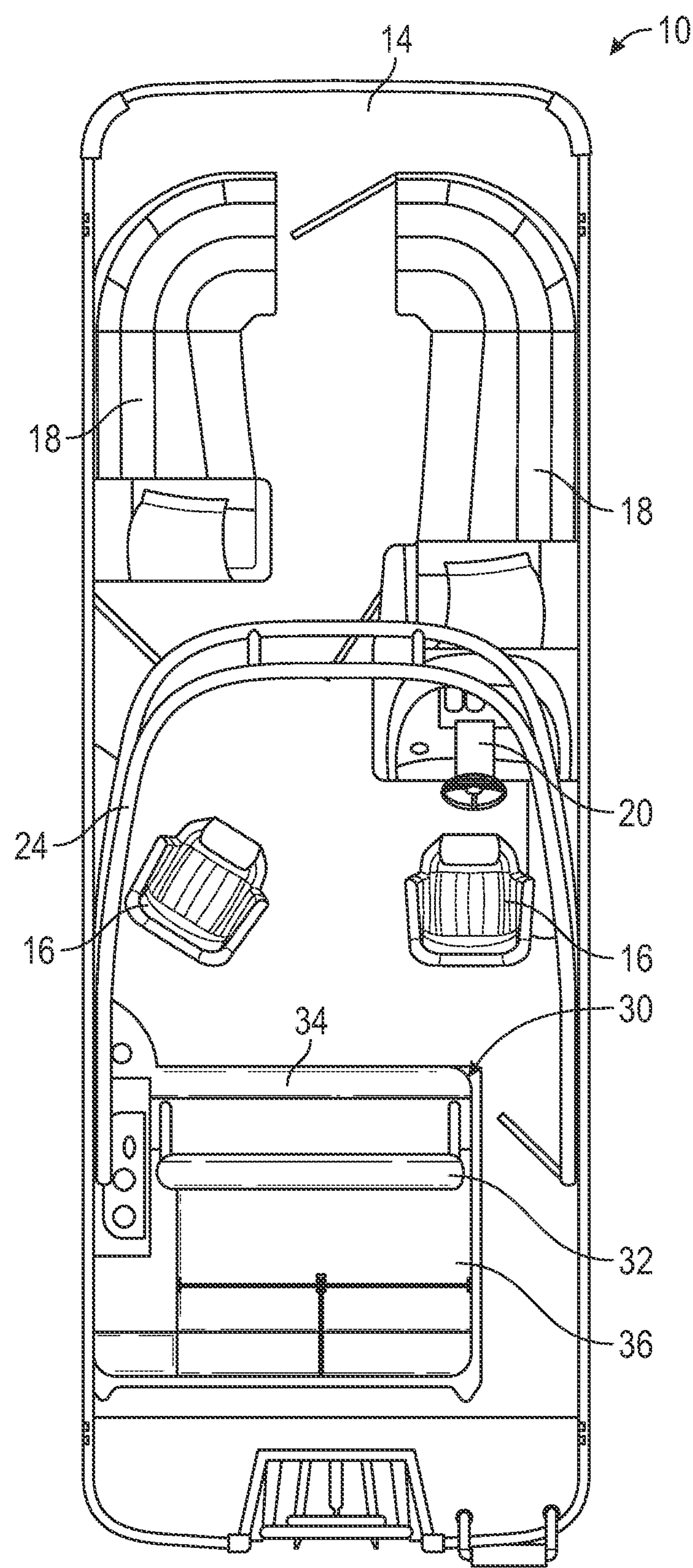
FIG. 1 is a plan, schematic view of a pontoon boat including an adjustable seat made in accordance with the present disclosure.

Corresponding reference characters indicate corresponding parts throughout the several views. The exemplifications set out herein illustrates embodiments of the invention, the embodiments disclosed below are not intended to be exhaustive or to be construed as limiting the scope of the invention in any manner.

DETAILED DESCRIPTION

Figure 2:
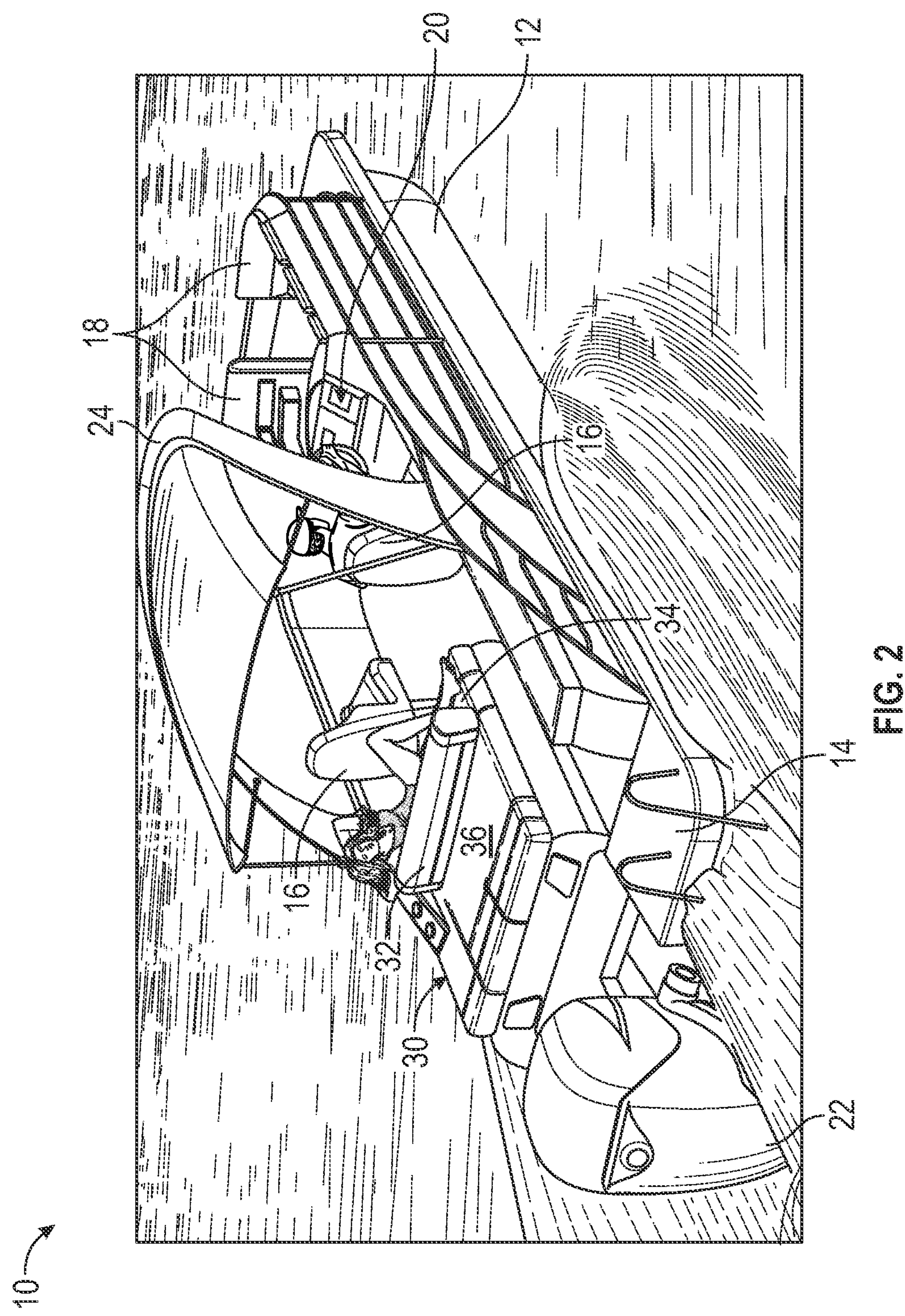
FIG. 2 is a perspective view of a pontoon boat including an adjustable seat made in accordance with the present disclosure, with the seat back configured in the aft position and a passenger seated facing the bow.
Figure 3:
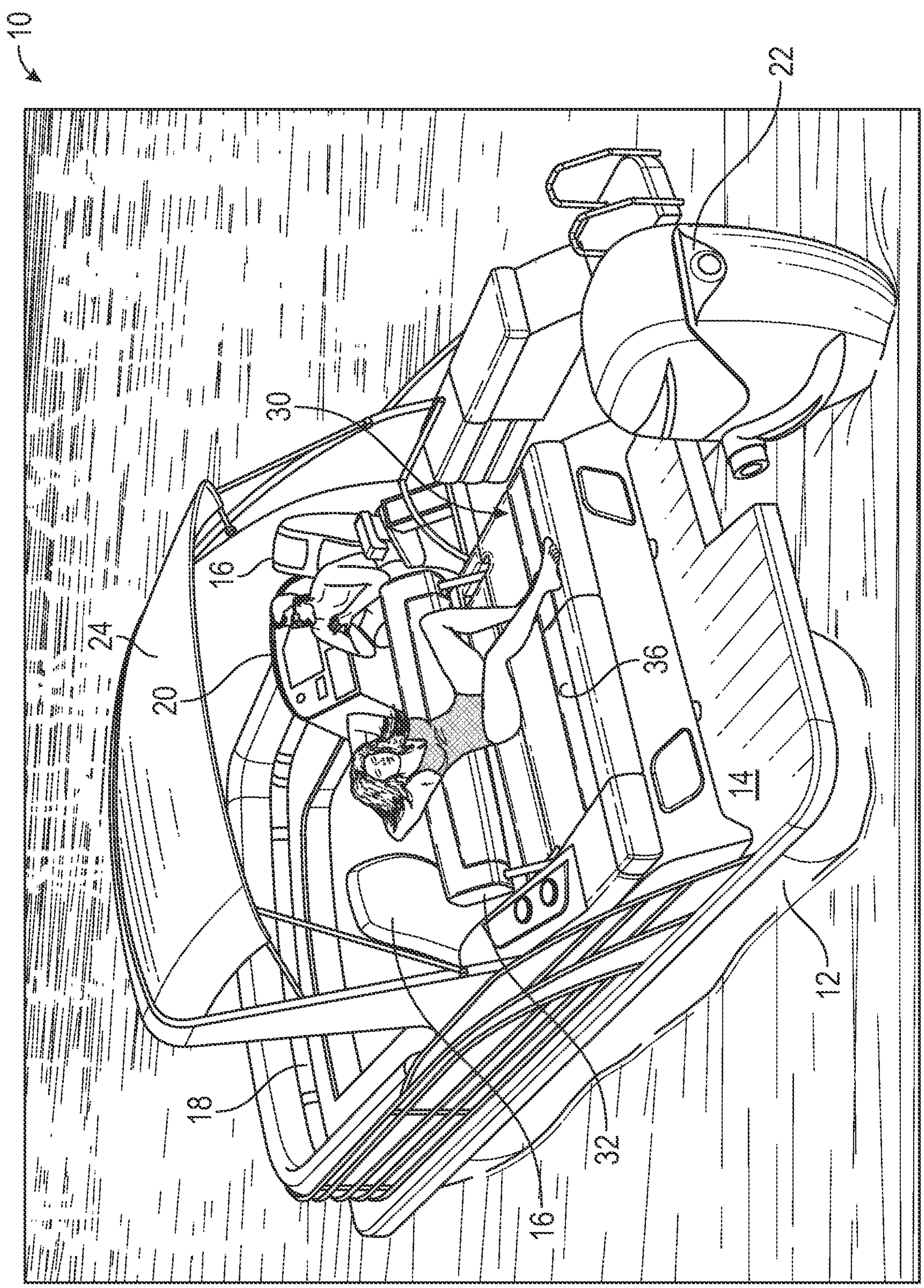
FIG. 3 is another perspective view of the pontoon boat shown in FIG. 2, with the seat back configured in the fore position and the passenger seated facing the stern.
Figure 9:
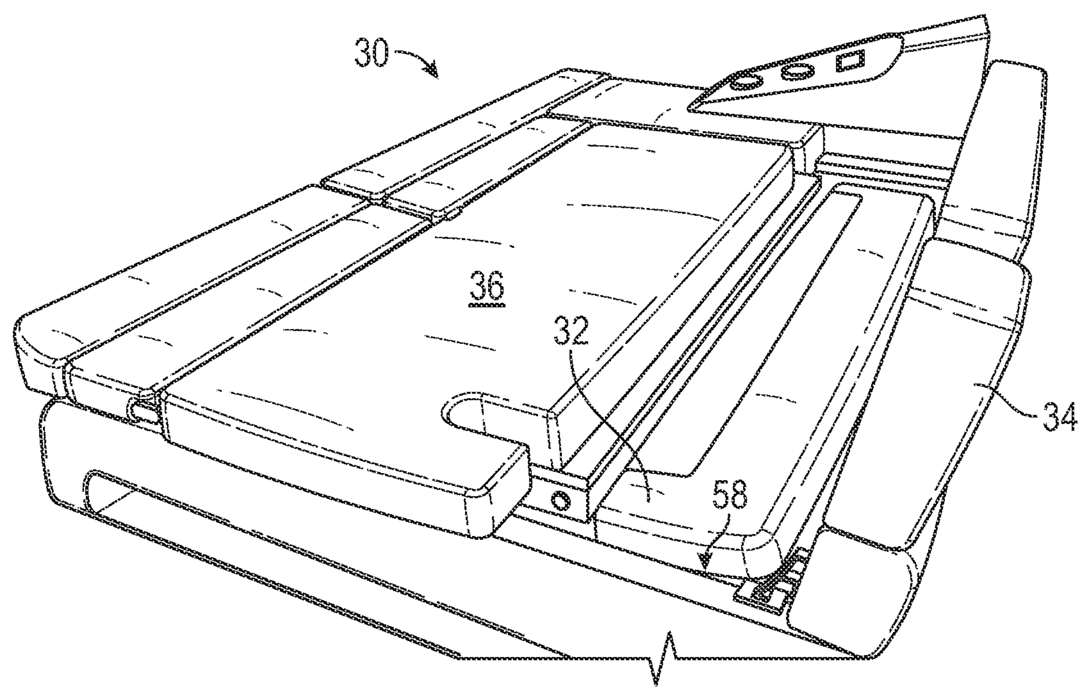
FIG. 9 is another perspective view of the adjustable seat shown in FIG. 8, with the seat back pivoted down into the seat back storage compartment.
Figure 10:
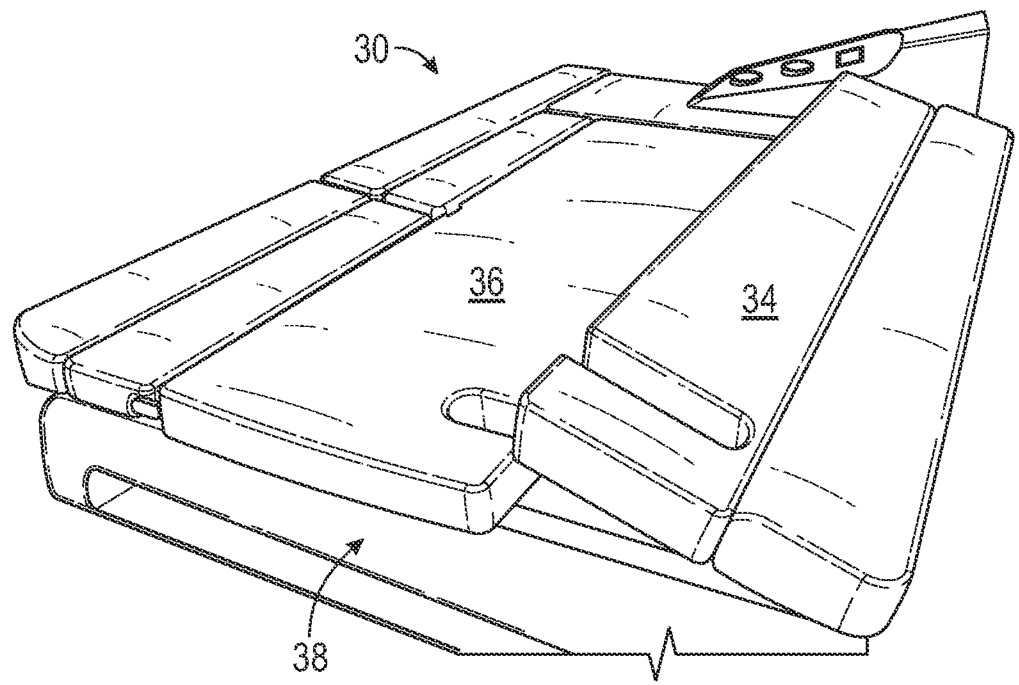
FIG. 10 is another perspective view of the adjustable seat shown in FIG. 9, with the seat back stowed in the seat back storage compartment and the fore seat being returned to its closed position.
Figure 11:
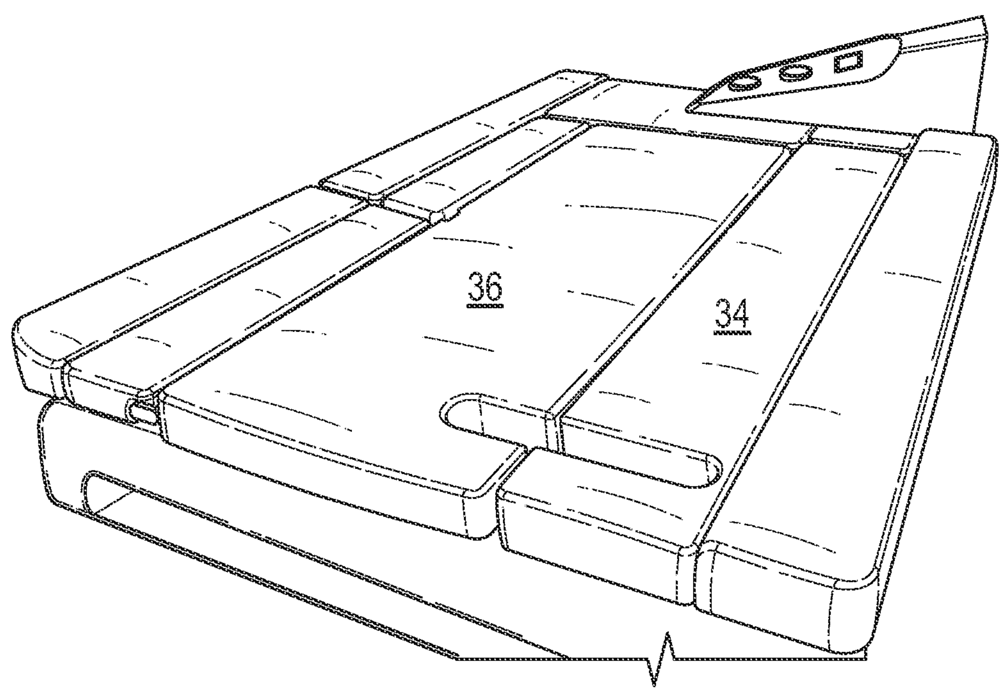
FIG. 11 is another perspective view of the adjustable seat shown in FIG. 10, with the fore seat in the closed position and the seat back stowed to position the seat assembly to present a planar bed-type surface from fore to aft.

The present disclosure provides an adjustable seat assembly 30, shown generally at FIGS. 1-11, including a seat back 32 which can be pivoted between a fore position shown in FIG. 3, and an aft position shown in FIG. 2. In the fore position, the seat back is configured to allow a user to sit in the stern-facing orientation shown in FIG. 3, while in the aft position, the seat back is configured to allow a user to sit in a bow-facing orientation shown in FIG. 2. As described in further detail below, the illustrated embodiment allows further pivoting of seat back 32 into a pillow orientation shown in FIG. 6, such that the user may lay across fore seat 34 and aft seat 36, In yet another configuration, seat back 32 may be stowed under fore seat 34 as shown in FIGS. 7-10 to provide an uninterrupted planar surface from the fore to aft edges of adjustable seat assembly 30, as shown in FIG. 11.

As best seen in FIG. 3, aft seat 36 of seat assembly 30 defines a relatively deep seat depth from the leading edge of the seat 36 to seat back 32, which provides a recliner-type seating arrangement in which a user's back contacts the stern-facing surface of seat back 32 and at least a majority of the user's legs are supported by aft seat 36. By contrast, fore seat 34 defines a relatively shallower seat depth from the leading edge of seat 34 to seat back 32, which provides a couch-type seating arrangement (FIG. 2) in which the user's back contacts the bow-facing surface of seat back 32 and the user's upper legs are supported by seat 34, while the user's feet can rest upon deck 14 of boat 10.

For purposes of the present disclosure, seat assembly 30 will be described with this illustrated configuration, it being understood that other configurations may also be utilized within the scope of the present disclosure. For example, the recliner-type and couch-type seating arrangements may be reversed, with the shallow seat 34 placed aftward and the deep seat 36 placed foreward. Two shallow seats 34 or two deep seats 36 may be provided. Moreover, it is contemplated that any other arrangements may be utilized as required or desired for a particular application, including any permutation of recliner-type and couch-type seating arrangements at the aft and/or fore positions of seat assembly 30.

As best seen in FIGS. 1-3, seat assembly 30 may be used in connection with pontoon boat 10. For example, seat assembly 30 may be supported by deck 14 at the stern portion of pontoon boat 10, and behind single occupancy seats 16, one of which is positioned adjacent controls 20. In the illustrated embodiment, a pair of sofa seats 18 are supported by deck 14 at the bow portion of boat 10. However, many other floor plan arrangements are contemplated within the scope of the present disclosure, including placing seat assembly 30 at the bow portion of boat 10, placing more than one seat assembly 30 within the floor plan of boat 10, and may other options.

In illustrated pontoon boat 10, a single deck 14 supports seat assembly 30 and all the other seats, and forms a generally planar surface extending from port to starboard and from bow to stern. At least two pontoons 12 are mounted to a lower surface of deck 14, and provide buoyancy for themselves, deck 14 and all the structures and equipment supported by deck 14. A motor 22 is mounted at the stern of boat 10 and controlled by controls 20, which are also used for controlling the direction of travel for boat 10 (e.g., by turning motor 22 about a vertical axis). In the illustrated embodiment, arch 24 extends upwardly from the port and starboard sides of boat 10 and may support a number of additional structures, such as canopies, speakers and the like.

In the context of pontoon boat 10, adjustable seat assembly 30 provides a configurable seating arrangement amenable to various types of common pontoon boat uses, such as sitting upright in a bow facing seating orientation, sitting partially supine in a stern facing orientation, and laying down for sunbathing and the like. Although adjustable seat assembly 30 is particularly suitable for use in the context of pontoon boat 10, it is contemplated that the principles of operation for seat assembly 30 may be applied to other seating designs and to other watercraft.

Figure 4:
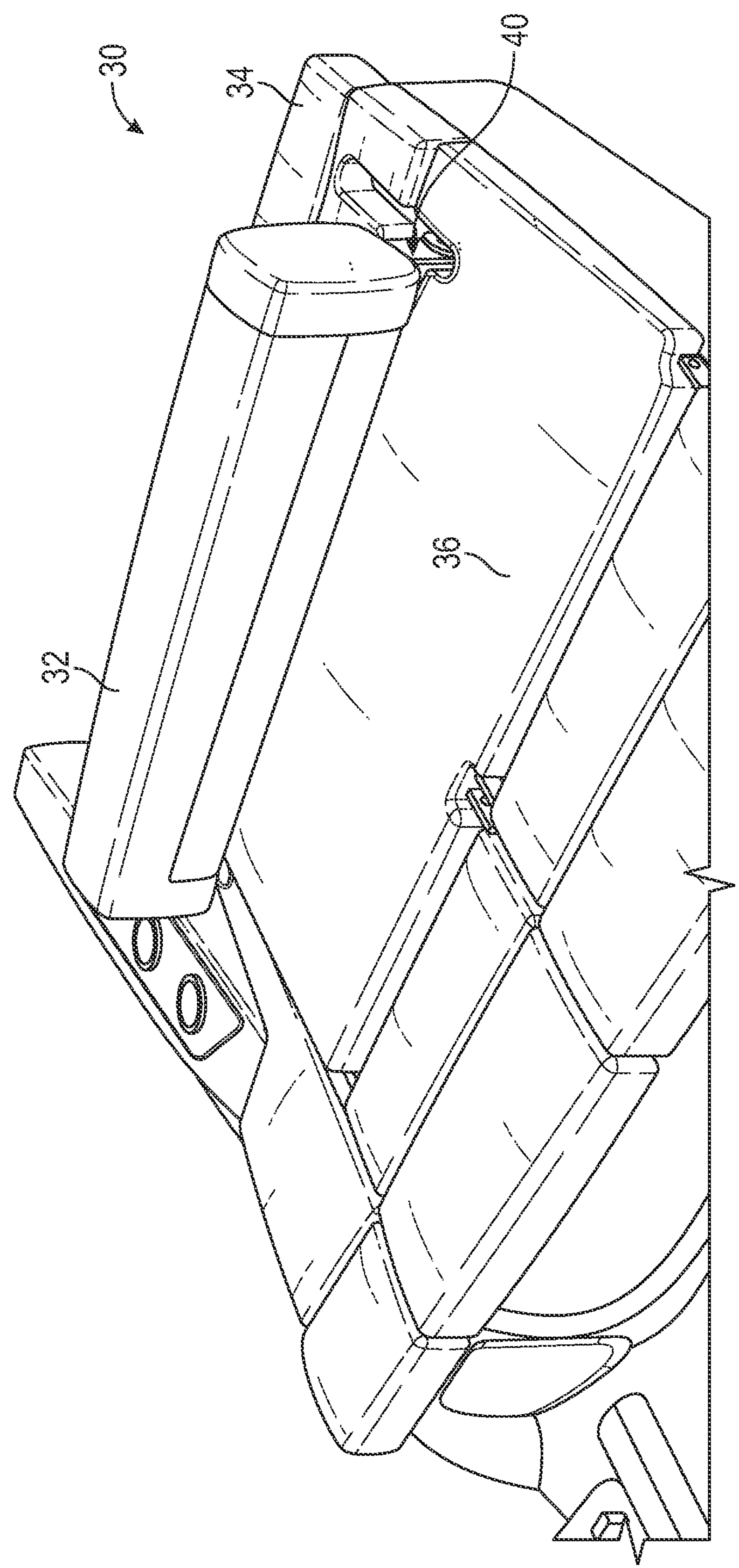
FIG. 4 is a perspective view of the adjustable seat shown in FIG. 2, with the seat back positioned in the aft position.

Turning now to FIGS. 2 and 4, seat back 32 is shown in the aft position such that the bow-facing seat surface cooperates with the upper surface of fore seat 34 to define an obtuse angle. That is, seat back 32 is configured to allow a user to sit comfortably on fore seat 34, as shown in FIG. 2, with an angle greater than 90° formed between the back and bottom seating surfaces to promote user comfort in a relaxed posture. The stern-facing seat surface may be substantially parallel to the bow-facing seat surface, and may therefore define an acute angle with the upper surface of aft seat 36. Linkage 40 supports and retains seat back 32 in this position, via a connection to seat substructure 38 mounted to deck 14 (FIGS. 7 and 8) as described in further detail below. In the illustrated aftward orientation, linkage 40 is positioned in the aft portion of a slot which spans fore seat 34 and aft seat 36. This slot allow for unimpeded movement of linkage 40 as seat back 32 is adjusted, as also described in detail below.

Figure 5:
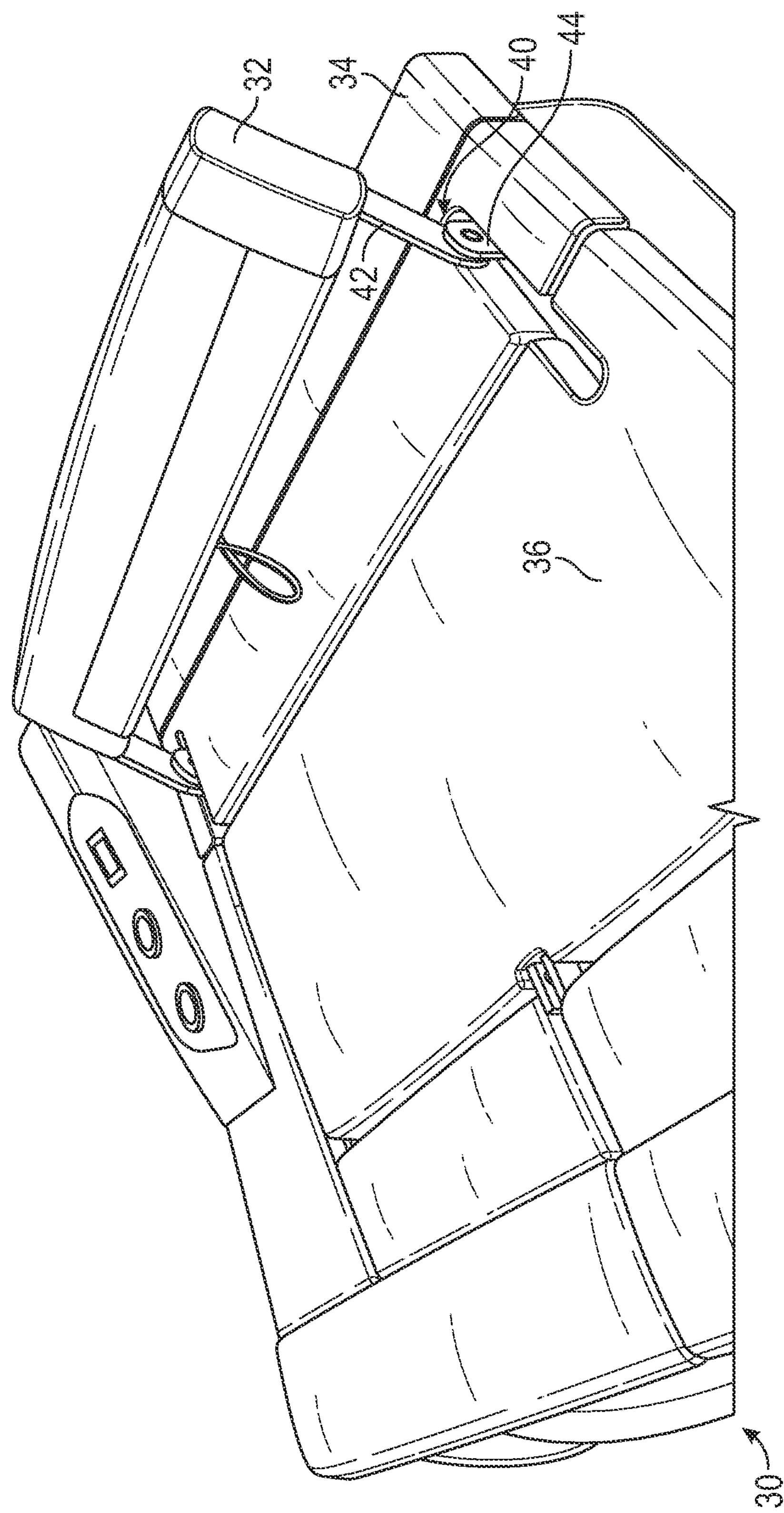
FIG. 5 is another perspective view of the adjustable seat shown in FIG. 4, with the seat back reconfigured to the fore position.

In FIG. 5, seat back 32 has been adjusted into its stern-facing, foreward position which facilitates a seat occupant sitting in a stern-facing seating orientation (FIG. 3). To adjust seat back 32 from the bow-facing seating orientation of FIG. 4 to the stern-facing seating orientation of FIG. 5, a user may simply push the seat back 32 forward, thereby articulating linkage 40 and pivoting seat back 32 as seat back arm 42 and seat base arm 44 pivot together through the slotted portion of seats 36 and 34. In the foreward position of FIG. 5, the stern-facing surface of seat back 32 defines an obtuse angle with the adjacent upper surface of aft seat 36, similar to the obtuse angle formed between the bow-facing surface and seat 34 described above with respect to FIG. 4. The bow-facing seat surface may therefore define an acute angle with the upper surface of fore seat 34 I this configuration. In the illustrated embodiment, the angle formed in the stern-facing seating orientation of FIG. 5 is greater than that of the bow-facing seating orientation of FIG. 4. This greater angle accommodates the recliner-type seating arrangement of FIG. 5, in which a user's back may contact the seat back 32 and at least a majority of the user's legs are supported by the aft seat 36.

Figure 6:
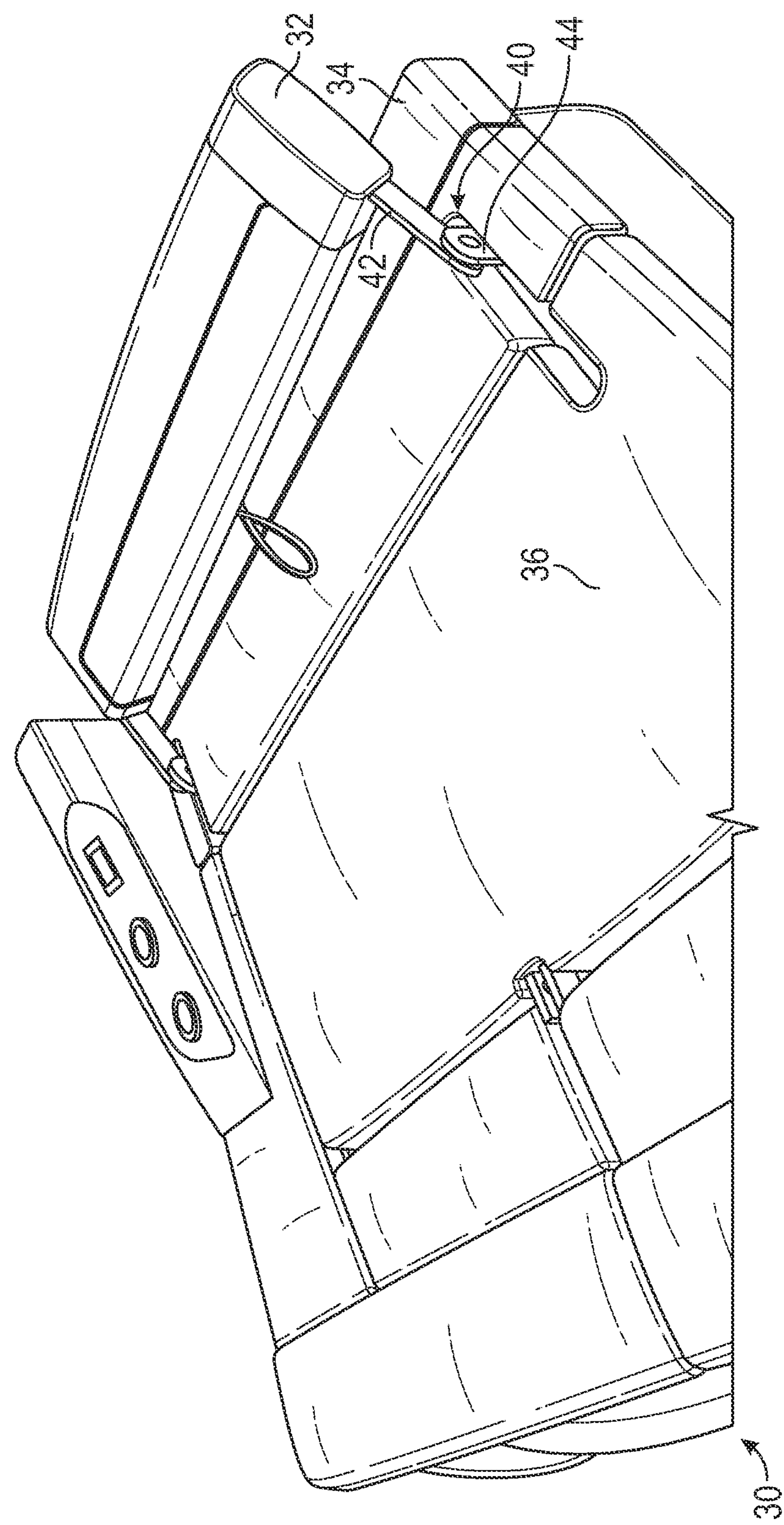
FIG. 6 is another perspective view of the adjustable seat shown in FIG. 5, with the seat back reconfigured to the pillow position.

FIG. 6 illustrates a further orientation of seat back 32 relative to the seating surfaces defined by fore and aft seats 34 and 36. In the illustrated embodiment, these seating surfaces are substantially coplanar and horizontal. In the pillow position of seat back 32, the stern-facing surface of seat back 32 defines an increased obtuse angle relative to the obtuse angle of the stern-facing recliner-type seating orientation shown in FIG. 5. In particular, seat back 32 may be further pivoted by articulating seat back arm 42 with respect to seat base arm 44 until the fore-facing surface of seat back 32 comes to rest in contact with the seating surface of fore seat 34. As described in further detail below, this action of further pivoting may be accomplished by lifting seat back 32 upwardly to dislodge it from a rotationally fixed orientation in the stern-facing, recliner-type seating orientation shown in FIG. 5.

Figure 7:
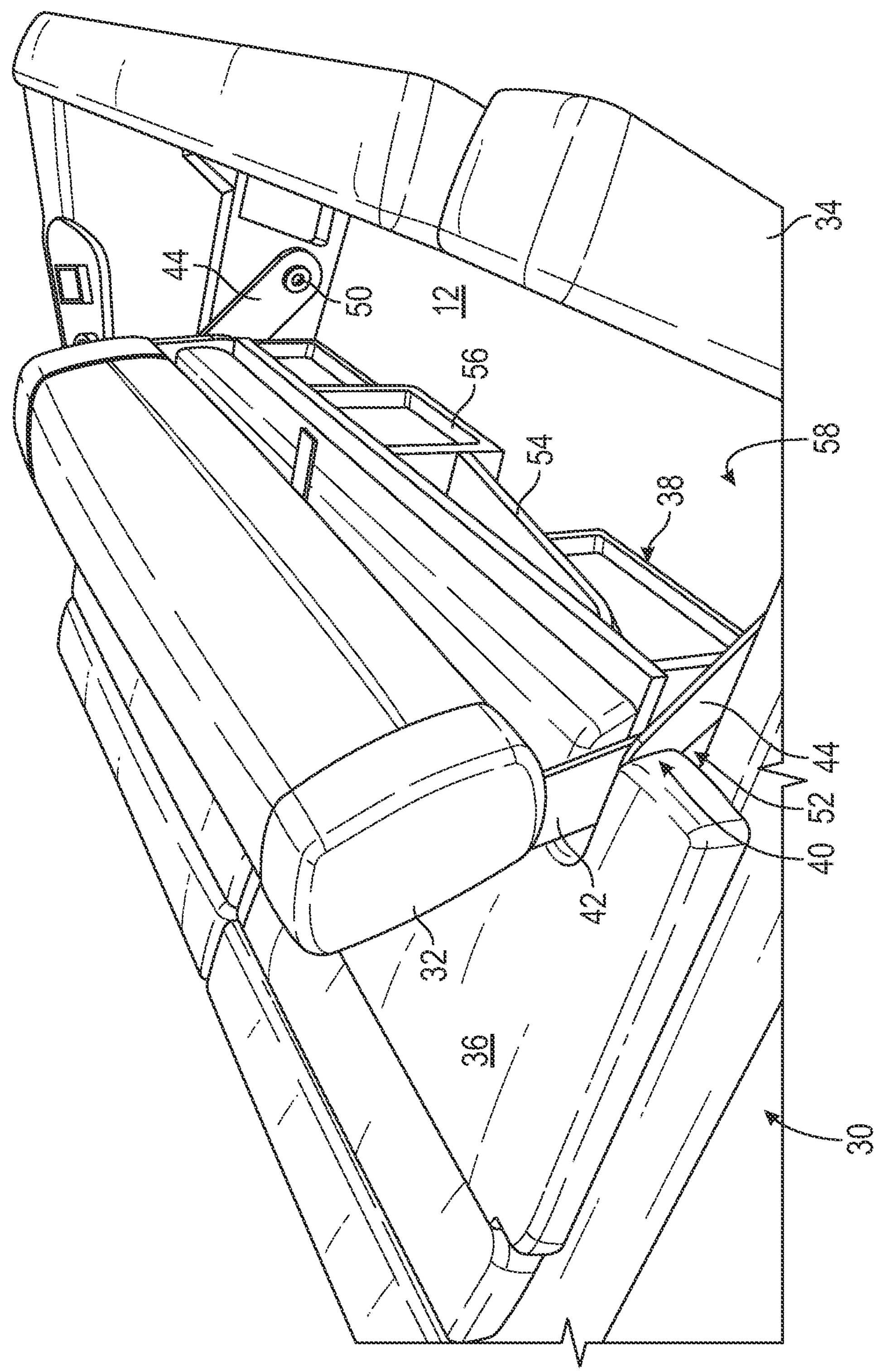
FIG. 7 is another perspective view of the adjustable seat shown in FIG. 4, with the seat back in the aft position and the fore seat pivoted open to expose the seat back storage compartment.
Figure 8:
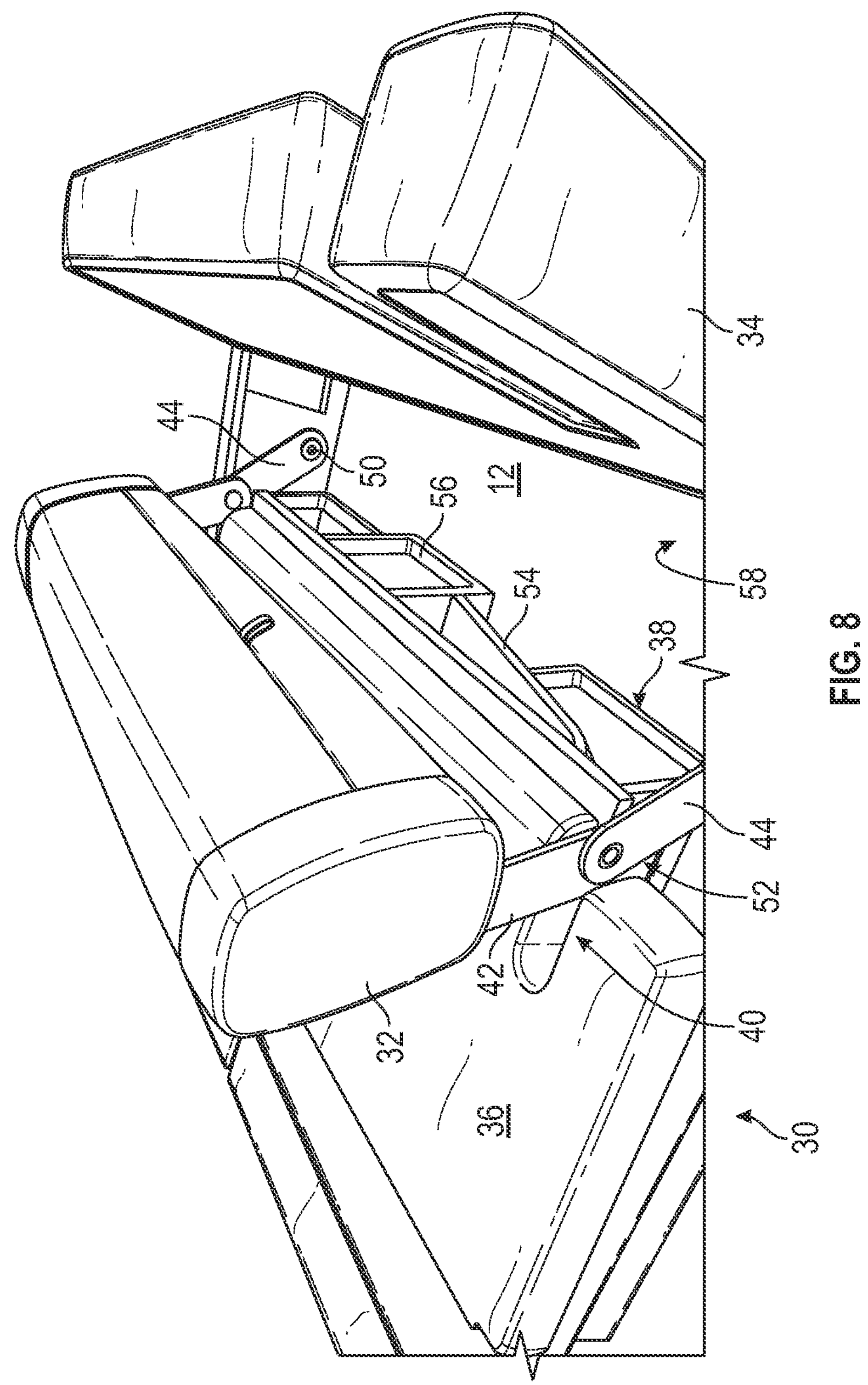
FIG. 8 is another perspective view of the adjustable seat shown in FIG. 7, showing activation of a seat back retention mechanism.

FIGS. 7-11 illustrate a mechanism and method by which seat back 32 may be further pivoted into a completely stowed position beneath fore seat 34, such that a continuous and uninterrupted, substantially planar, and horizontal seat surface is presented along the entire aft-to-fore extent of seat assembly 30 (FIG. 11). In the illustrated embodiment of FIG. 7, seat back storage compartment 58 is formed as void underneath fore seat 34, which may be pivoted upwardly and forwardly about a pivot point at its forward edge. This pivoting exposes compartment 58 as shown in FIGS. 7 and 8. To allow this upward pivoting motion, seat back 32 is placed in the aft position and away from spatial conflict with the lifting of fore seat 34.

As noted above, the illustrated embodiment of seat assembly 30 includes a bow-facing seating arrangement for a couch-type seat and a stern-facing seating arrangement for a recliner-type seat, though other arrangements are contemplated. In alternative configurations, seat back storage compartment 58 may be placed under aft seat 36 or at any suitable location, depending on the location and arrangement of seat back 32 and the components of linkage 40.

With fore seat 34 pivotably attached, seat 34 need not be disconnected from seat base 38 in order to expose seat back storage compartment 58 (FIG. 7). However, fore seat 34 may be removeable or reconfigurable in any other suitable way, such as by being completely removable or slidable for example.

With storage compartment 58 exposed, a user may free seat back 32 to pivot downwardly by actuating retention crossbar 54. In the illustrated embodiment, this actuation is accomplished by a grip or handle 56. Upon such actuation, crossbar 54 moves laterally inwardly to withdraw its end out of engagement with a notch 52 (FIG. 12) formed in seat base arm 44. A similar withdrawal may occur at both the port and starboard sides of seat assembly 30, either by actuation of handle 56 to move both ends of two crossbars 54, or by a separate actuating motion for each side. In the illustrated embodiment of FIG. 8, seat back 32 may be slightly lifted to relieve pressure between notch 52 and crossbar 54 to facilitate disengagement.

With crossbar 54 withdrawn from engagement with linkage 40, seat base arm 44 is free to pivot downwardly toward deck 12. At the same time, seat back arm 42 may also pivot back toward seat base arm 44 as seat back 32 is lowered into storage compartment 58, as shown in FIG. 9. Once seat back 32 is fully contained within compartment 58, fore seat 34 may be replaced to its original position, such as by pivoting aftward as shown in FIG. 10. When fore seat 34 is fully replaced to its original position as shown in FIG. 11, seats 34 and 36 create a substantially flat, horizontal and continuous surface along the fore-to-aft direction without interruption by seat back 32. This bed-type surface is amenable to a user laying supine.

Seat back 32 may be withdrawn from storage compartment 58 by a reverse process. Briefly, fore seat 34 may be pivoted upwardly or otherwise removed, and a user may grasp seat back 32 and lift it upwardly to articulate linkage 40. Seat back 32 may be placed in its aft position, and the retention mechanism may be articulated (e.g., by handle 56) back into a locked position such that retention crossbar 54 engages notch 52 of linkage 40, thereby preventing seat base arm 44 from pivoting downwardly. Fore seat 34 may then be pivoted closed or otherwise replaced, at which point seat back 32 may again be reconfigured from the aftward, bow-facing seating configuration to either the foreward, stern-facing configuration or the pillow configuration.

Details of linkage 40 are shown in FIGS. 12-14B. Linkage 40 includes seat back arm 42 with an upper portion fixed to seat back 32 and a lower portion pivotably connected to an upper portion of seat base arm 44. A lower portion of seat base arm 44 is pivotably attached to substructure 38 of seat assembly 30. In an exemplary embodiment and as illustrated, the lower portion of seat base arm 44 may be coupled to substructure 38 via anchor 50, also as shown in FIGS. 7 and 8. Anchor 50 may have a threaded shank passing through a correspondingly sized aperture in seat base arm 44 and being threadably received in a correspondingly threaded hole of substructure 38. In the illustrated embodiment, anchor 50 may be tightened by hand to abut an adjacent surface of seat base arm 44 while still allowing free pivoting rotation of seat base arm 44.

Figure 12:
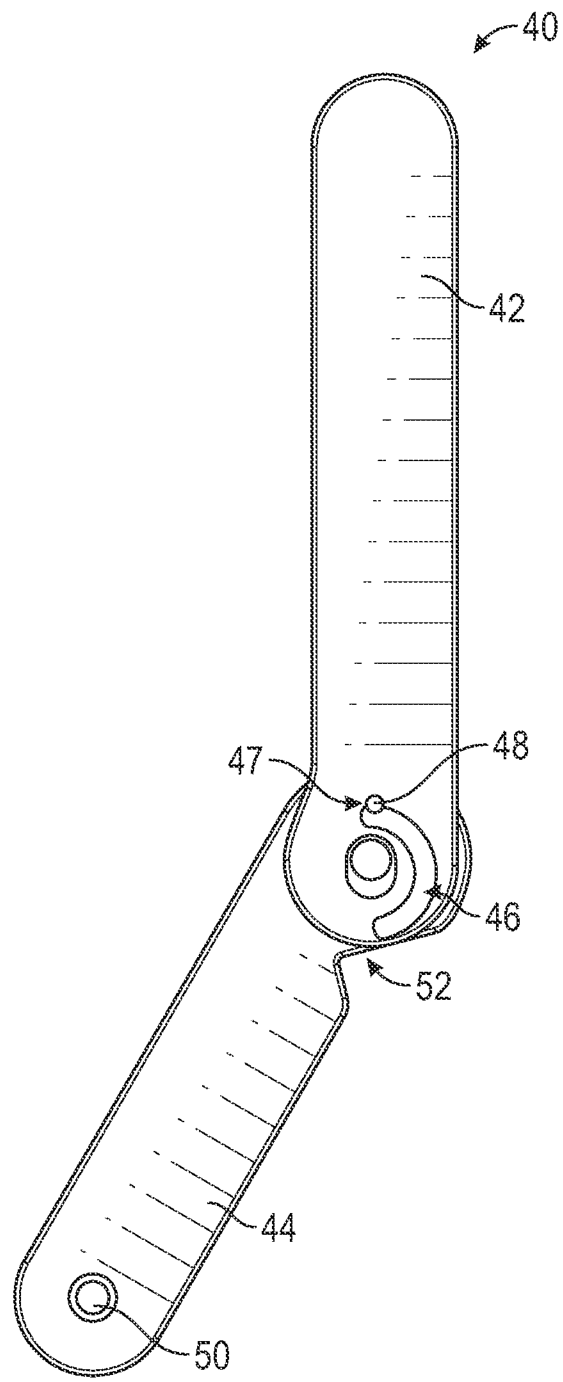
FIG. 12 is a side elevation view of a portion of the linkage assembly connecting the seat back of FIG. 2 to the seat base.

The pivotable connection between seat back arm 42 and seat base arm 44 is constrained, by the interaction of an arcuate slot 46 formed in arm 42 and a pin fixed to arm 44, as shown in FIGS. 12 and 13. When assembled as linkage 40, pin 48 is received in slot 46. In order for arms 42 and 44 to pivot relative to one another, such pivoting must also accommodate the movement of pin 48 through slot 46. As best shown in FIG. 12, slot 46 has an arcuate extent around the pivot point which defines a substantially constant radial distance from such pivot point and extends around less than the entire potential range of motion between arms 42 and 44. In the illustrated embodiment, for example, slot 46 has a total angular extent of slightly less than 180°, which is sufficient to provide the full range of motion needed for reconfiguration of seat back 32 among all its configurations as discussed in detail above. Of course, other angular extents may be appropriate for other configurations of seat assembly 30 and may be utilized as required or desired for a particular application.

Arcuate slot 46 further includes tail 47 which extends radially away from slot 46, as shown in FIGS. 12 and 13. As illustrated in FIG. 12, pin 48 may be received within tail 47, at which time seat back arm 42 is effectively rotationally locked with respect to seat base arm 44. This is the rotational configuration corresponding to both the aftward position of seat back 32 shown in FIGS. 3 and 5, as well as the foreward position of seat back 32 shown in FIGS. 2 and 4. When in this rotationally-locked configuration, pivoting seat back 32 pivots both the seat base arm 44 (about the pivot point at anchor 50) and the seat back arm 42. The limits of this pivoting motion are set by physical contact between linkage 40 and adjacent structures, such as the abutting contact between notch 52 and crossbar 54 for the aftward position of seat back 32.

In the illustrated configuration, gravity and the weight of seat back 32 tends to retain pin 48 within tail 47. To withdraw pin 48 from tail 47 and once again allow pin 48 to travel through arcuate slot 46, seat back 32 may be lifted upwardly. As noted above, lifting seat back 32 upwardly allows for reconfiguration of seat back 32 from the foreward position to the pillow configuration. This lifting operation may also allow seat back 32 downwardly into storage compartment 58, as pin 48 must to move freely through arcuate slot 46 to pivot downwardly relative to seat base arm 44 as seat back 32 lowers into compartment 58.

As noted above, seat assembly 30 includes a pair of linkages 40, with one at the starboard side of seat back 32 and one at the port side thereof. In the illustrated embodiment, this arrangement may utilize a pair of mirror-image linkage assemblies 40 as shown in FIGS. 14A and 14B respectively. For purposes of the present disclosure, the details of seat back arm 42 pertain to both seat back arms 42A and 42B, which are mirror images of one another. Similarly, discussions of seat base arm 44 pertain to both seat base arms 44A and 44B, which may also be mirror images of one another. Variations in linkage 40 may be used as required or desired for a particular application. For example, pin 48 may be replaced with a simple protrusion extending outwardly from seat base arm 44. Additionally, slot 46 and pin 48 may be reversed to be present on the opposite component, i.e., slot 46 may be formed in seat base arm 44 and pin 48 or another protrusion may be fixed to seat back arm 42.

While this invention has been described as having exemplary designs, the present invention may be further modified with the spirit and scope of this disclosure. Further, this application is intended to cover such departures from the present disclosure as come within known or customary practice in the art to which this invention pertains.

What is claimed is:

1. A seat assembly for a boat, the seat assembly comprising:
- an aft seat;
- a fore seat; and
- a seat back pivotable between a first seating orientation and a second seating orientation, the seat back further adjustable into a pillow orientation from one of the first orientation and the second orientation, the seat back being moveable to provide an upwardly-facing planar support surface extending across the aft seat and the fore seat unobstructed by the seat back when the seat back is stored lower than an upper surface of the aft seat and lower than an upper surface of the fore seat.

2. The seat assembly of claim 1, further including a substructure to which the seat back is connected.

3. The seat assembly of claim 2, wherein the substructure is pivotably connected to the seat back via a linkage assembly.

4. The seat assembly of claim 3, wherein the linkage assembly comprises:
- a seat back arm fixed to the seat back; and
- a seat base arm connected to the substructure, the seat back arm being pivotably connected to the seat base arm.

5. The seat assembly of claim 4, wherein the seat back arm or the seat base arm includes an arcuate slot.

6. The seat assembly of claim 4, wherein the linkage assembly comprises:
- a retention crossbar selectively engaged with the seat base arm to limit a rotation of the seat base arm when engaged and to allow the rotation of the seat base arm when disengaged, such that the seat base arm facilitates the seat back entering a stowed position as the seat base arm rotates.

7. The seat assembly of claim 1, wherein:
- the seat back in the first seating orientation has a stern-facing surface defining an obtuse angle with an upper surface of the aft seat, and
- the seat back in the first seating orientation has a bow-facing surface defining an obtuse angle with an upper surface of the fore seat.

8. A seat assembly for a boat, the seat assembly comprising:
- an aft seat;
- a fore seat; and
- a seat back pivotable between a first seating orientation and a second seating orientation, the seat back further adjustable into a pillow orientation from one of the first orientation and the second orientation; and
- a substructure to which the seat back is pivotably connected via a linkage assembly, the linkage assembly comprising:
  - a seat base arm connected to the substructure, wherein the seat base arm is pivotable connected to the substructure; and
  - a retention crossbar selectively engaged with the seat base arm to limit a rotation of the seat base arm when engaged and to allow the rotation of the seat base arm when disengaged, such that the seat base arm facilitates the seat back entering a stowed position as the seat base arm rotates.

9. The seat assembly of claim 8, wherein the seat back is pivotable into the stowed position beneath the fore seat or the aft seat.

10. The seat assembly of claim 8, wherein the linkage assembly further comprises a seat back arm fixed to the seat back, wherein the seat back arm is pivotably connected to the seat base arm.

11. The seat assembly of claim 10, wherein one of the seat base arm and the seat back arm includes an arcuate slot.

12. The seat assembly of claim 8, wherein the seat base arm include a notch sized and positioned to receive the retention crossbar when engaged.

13. The seat assembly of claim 8, wherein:
- the seat back in the first seating orientation has a stern-facing surface defining an obtuse angle with an upper surface of the aft seat, and
- the seat back in the first seating orientation has a bow-facing surface defining an obtuse angle with an upper surface of the fore seat.

14. A pontoon boat comprising:
- at least two pontoons; and
- a deck mounted atop the at least two pontoons,
- wherein the seat assembly of claim 8 is mounted to the deck.

15. A seat assembly for a boat, the seat assembly comprising:
- an aft seat;
- a fore seat;
- a seat back pivotable between a first seating orientation and a second seating orientation, the seat back further adjustable into a pillow orientation from one of the first orientation and the second orientation; and
- a substructure to which the seat back is pivotably connected via a linkage assembly, the linkage assembly comprising:
  - a seat back arm fixed to the seat back; and
  - a seat base arm connected to the substructure, the seat back arm pivotably connected to the seat base arm, wherein one of the seat base arm and the seat back arm includes an arcuate slot.

16. The seat assembly of claim 15, wherein the other of the seat base arm and the seat back arm includes a protrusion positioned to be received in the arcuate slot when the seat base arm is pivotably connected to the seat back arm.

17. The seat assembly of claim 16, wherein the protrusion and the arcuate slot define the range of pivotable motion of the seat back.

18. The seat assembly of claim 17, wherein:

the arcuate slot extends around an arcuate extent having a substantially constant radial distance from a pivot point defined by the pivotable connection of the seat base arm and the seat back arm, and the arcuate slot further includes a tail extending radially away from the arcuate slot, such that the pin can extend into the tail to selectively fix the seat back at a rotational position.

19. The seat assembly of claim 18, wherein the seat back is moveable to provide an upwardly-facing planar support surface extending across the aft seat and the fore seat unobstructed by the seat back when the seat back is stored lower than an upper surface of the aft seat and lower than an upper surface of the fore seat.

20. The seat assembly of claim 15, wherein:

the seat back in the first seating orientation has a stern-facing surface defining an obtuse angle with an upper surface of the aft seat, and the seat back in the second seating orientation has a bow-facing surface defining an obtuse angle with an upper surface of the fore seat.

21. A seat assembly for a boat, the seat assembly comprising:

an aft seat having a leading edge and a first width;

a fore seat having a leading edge a second width;

a seat back pivotable between a first seating orientation and a second seating orientation; and a substructure to which the seat back is pivotably connected via a first linkage assembly and a second linkage assembly, a separation between the first linkage assembly and the second linkage assembly defining a third width, the third width being less than the first width and the second width, the first linkage assembly and the second linkage assembly being positioned between the leading edge of the aft seat and the leading edge of the fore seat.

* * * * *